US008518138B2

(12) United States Patent
Ryuzaki

(10) Patent No.: US 8,518,138 B2
(45) Date of Patent: Aug. 27, 2013

(54) IMAGE FORMING APPARATUS

(75) Inventor: Teruyo Ryuzaki, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 83 days.

(21) Appl. No.: 13/248,430

(22) Filed: Sep. 29, 2011

(65) Prior Publication Data

US 2012/0240534 A1 Sep. 27, 2012

(30) Foreign Application Priority Data

Mar. 25, 2011 (JP) ................................ 2011-068743

(51) Int. Cl.
*B01D 50/00* (2006.01)

(52) U.S. Cl.
USPC ............ 55/385.1; 55/467; 396/575; 430/350

(58) Field of Classification Search
USPC ............... 55/385.1, 302, 320, 337, 356, 429, 55/472, 476, 351, 352, 353, 354; 222/152, 222/146.5; 239/130; 96/140; 422/211; 454/63, 65
See application file for complete search history.

(56) References Cited

U.S. PATENT DOCUMENTS

| | | | | |
|---|---|---|---|---|
| 7,455,706 | B2 * | 11/2008 | Latham et al. | 55/385.1 |
| 7,510,596 | B2 * | 3/2009 | Struble et al. | 95/90 |
| 7,513,922 | B2 * | 4/2009 | Cheng | 55/385.1 |
| 7,527,680 | B2 * | 5/2009 | Horiguchi et al. | 96/422 |
| 7,635,401 | B2 * | 12/2009 | Dietz | 55/385.1 |
| 2006/0260341 | A1 * | 11/2006 | Meyvis | 62/331 |
| 2011/0200494 | A1 * | 8/2011 | Tanaka | 422/211 |

* cited by examiner

*Primary Examiner* — Duane Smith
*Assistant Examiner* — Minh-Chau Pham
(74) *Attorney, Agent, or Firm* — Oliff & Berridge, PLC

(57) ABSTRACT

An image forming apparatus includes a duct, a fan, a guide duct, and a filter. Air flows through the duct from an intake port in a front face of an apparatus body toward a first exhaust port in a rear face. The fan is provided in the duct and takes in the air via the intake port and exhausts the air via the first exhaust port. The guide duct is provided at the rear face, covers the first exhaust port and a second exhaust port via which exhaust air containing an odorous component produced inside the apparatus body is exhausted from the rear face, and guides the exhaust air from the first and second exhaust ports upward in a vertical direction. The filter is provided in the guide duct downstream from the first and second exhaust ports in the vertical direction and removes the odorous component from the exhaust air.

5 Claims, 4 Drawing Sheets

IMAGE FORMING APPARATUS

CROSS-REFERENCE TO RELATED APPLICATIONS

This application is based on and claims priority under 35 USC 119 from Japanese Patent Application No. 2011-068743 filed Mar. 25, 2011.

BACKGROUND

(i) Technical Field

The present invention relates to image forming apparatuses.

SUMMARY

According to an aspect of the invention, there is provided an image forming apparatus including a duct, a fan, a guide duct, and a filter. Air flows through the duct from an intake port formed in a front face of an apparatus body toward a first exhaust port formed in a rear face of the apparatus body. The fan is provided in the duct and takes in the air via the intake port and exhausts the air via the first exhaust port. The guide duct is provided at the rear face of the apparatus body and covers the first exhaust port and a second exhaust port via which exhaust air containing an odorous component produced inside the apparatus body is exhausted from the rear face of the apparatus body. Moreover, the guide duct guides the exhaust air from the first exhaust port and the second exhaust port upward in a vertical direction. The filter is provided in the guide duct downstream from the first exhaust port and the second exhaust port in the vertical direction and removes the odorous component from the exhaust air exhausted from the first exhaust port and the second exhaust port.

BRIEF DESCRIPTION OF THE DRAWINGS

Exemplary embodiment(s) of the present invention will be described in detail based on the following figures, wherein.

DETAILED DESCRIPTION

An example of an image forming apparatus according to an exemplary embodiment of the present invention will now be described.

Figure 1:
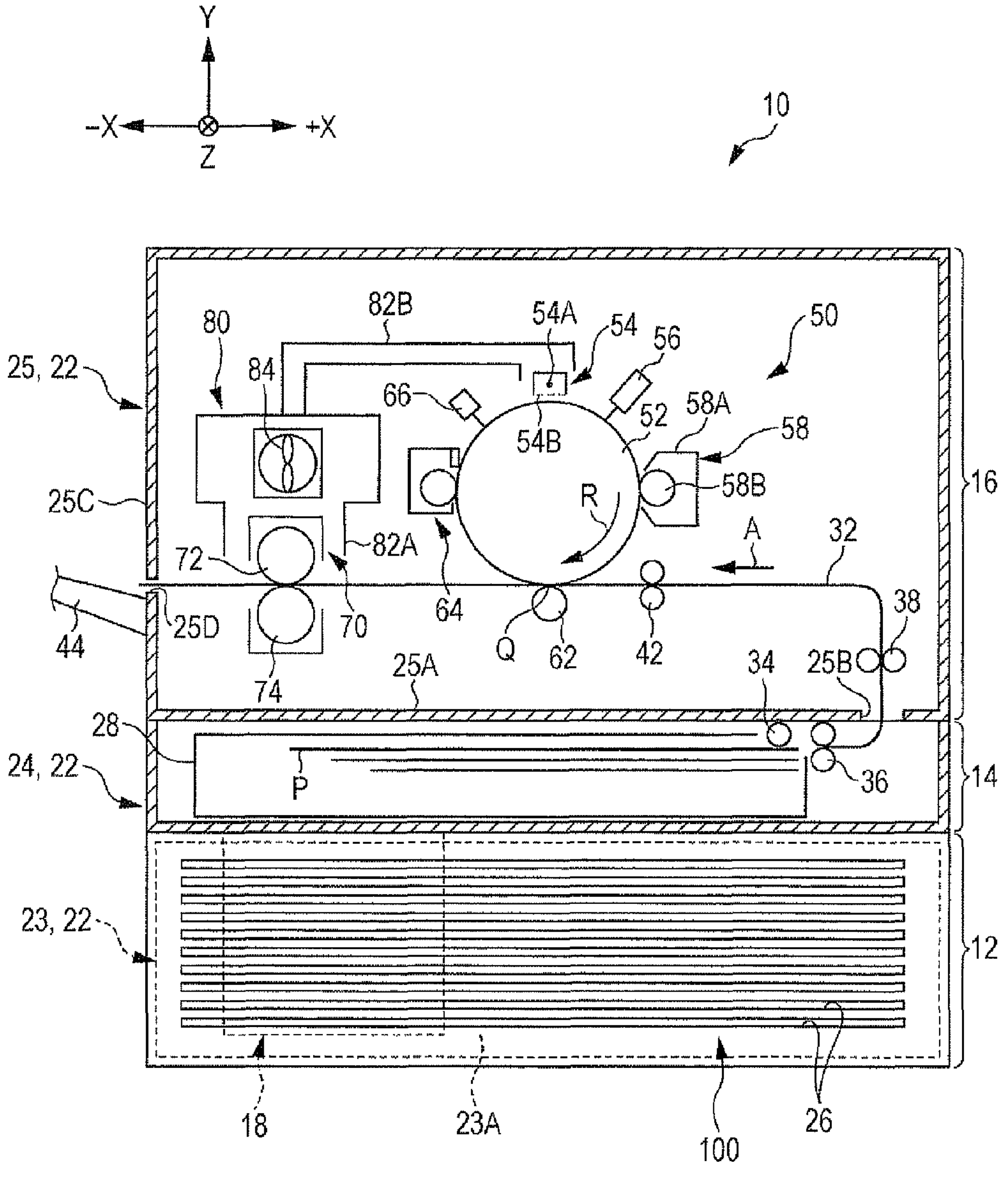
FIG. 1 is an overall view of an image forming apparatus according to an exemplary embodiment of the present invention.

FIG. 1 illustrates an image forming apparatus 10 according to the exemplary embodiment as an example. As viewed bottom-up in the vertical direction (i.e., a direction indicated by an arrow Y), the image forming apparatus 10 includes a purifier accommodating section 12 that accommodates a part of a space purifier 100, to be described in detail below, a paper accommodating section 14 that is provided above the purifier accommodating section 12 and that accommodates recording paper P serving as an example of a recording medium, and an image forming section 16 that is provided above the paper accommodating section 14 and that forms an image on the recording paper P supplied from the paper accommodating section 14. The image forming apparatus 10 also includes a controller 18 that is provided at the rear side of the purifier accommodating section 12 and the paper accommodating section 14 and that controls the operation of each section of the image forming apparatus 10.

The image forming apparatus 10 has a housing 22 serving as an example of an apparatus body. The housing 22 includes a first housing 23 that embraces the purifier accommodating section 12, a second housing 24 that embraces the paper accommodating section 14, and a third housing 25 that embraces the image forming section 16.

Figure 2A:
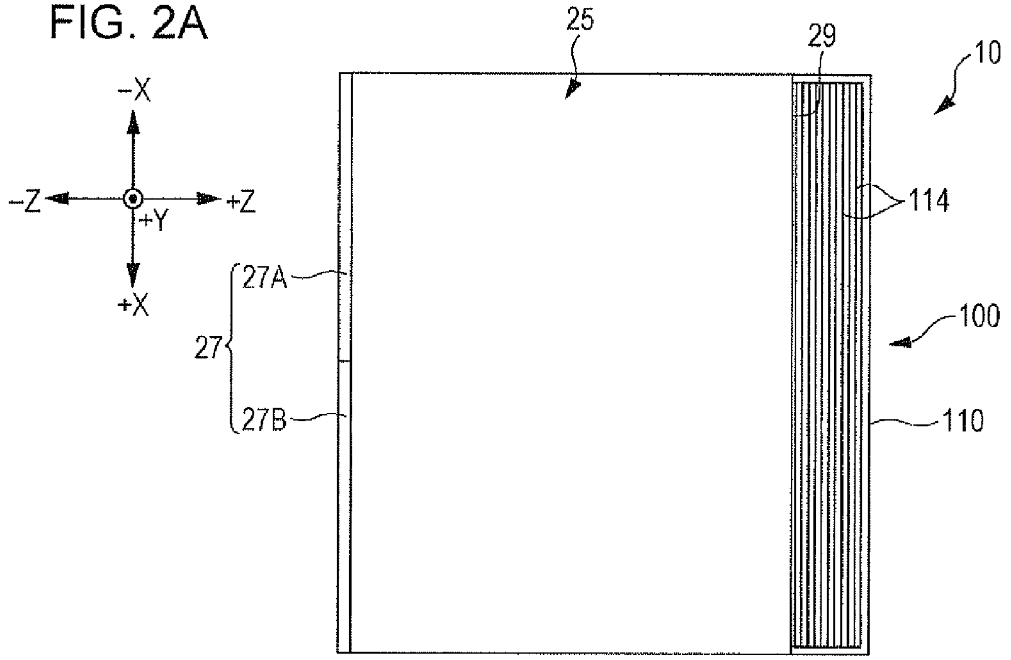
FIG. 2A is a plan view of the image forming apparatus according to the exemplary embodiment of the present invention.
Figure 2B:
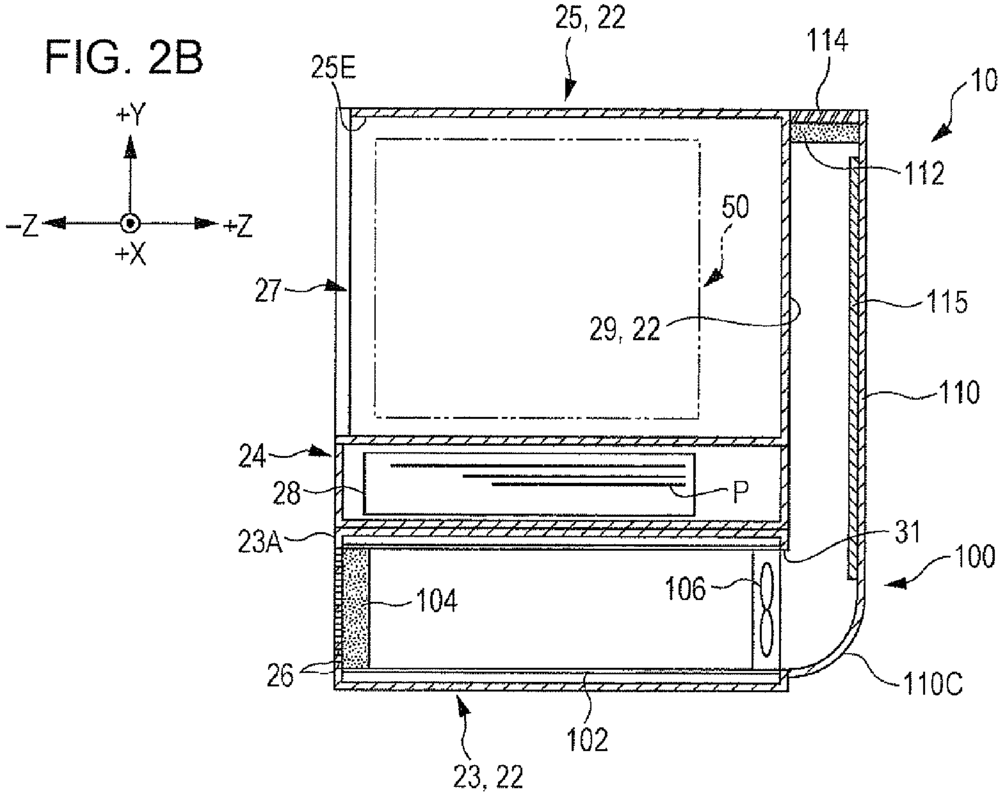
FIG. 2B is a longitudinal sectional view of the image forming apparatus according to the exemplary embodiment of the present invention.

Referring to FIG. 2B, the front side of the third housing 25 is provided with an opening 25E, and a cover member 27 is provided to cover the opening 25E. Referring to FIG. 2A, the cover member 27 includes a left cover 27A and a right cover 27B that are rotatable about hinges (not shown). The left cover 27A and the right cover 278 are opened or closed in a double-door fashion or are individually opened or closed so that the front side of the image forming section 16 can be exposed or covered (closed).

Figure 3:
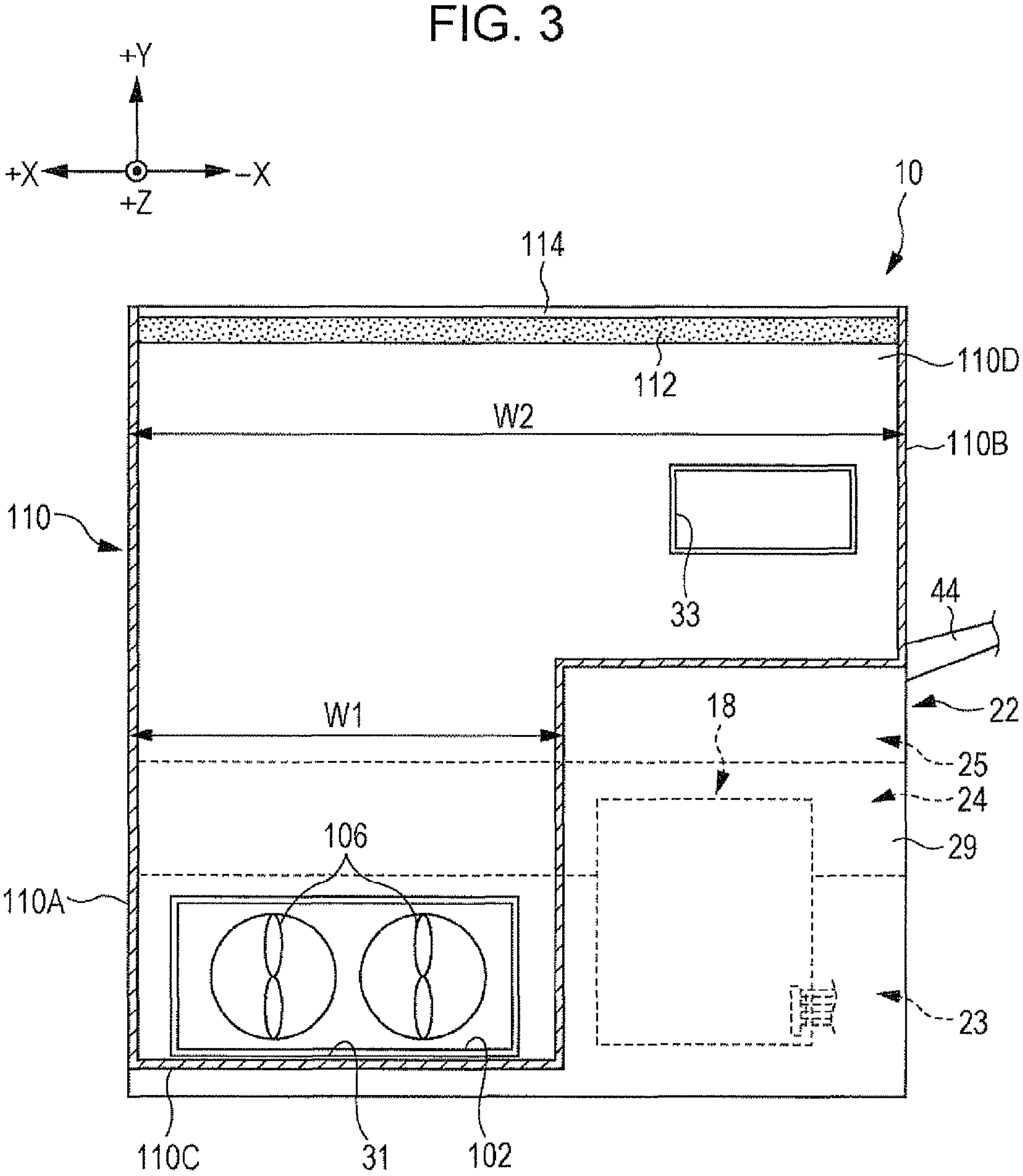
FIG. 3 illustrates the configuration of a rear face of the image forming apparatus according to the exemplary embodiment of the present invention.

Referring to FIG. 3, the housing 22 has a rear wall 29 that serves as a rear face of the image forming apparatus 10. The rear wall 29 is provided with a first exhaust port 31 for exhausting air from a first duct 102, to be described later, and a second exhaust port 33 for exhausting air from a second duct 80 (see FIG. 1). The second exhaust port 33 is not located above the first exhaust port 31. The rear wall 29 is a single unit constituted of rear walls of the first housing 23, the second housing 24, and the third housing 25.

In the following description, when the image forming apparatus 10 is viewed from the front side, the vertical direction, the left-right direction (horizontal direction), and the front-rear direction (horizontal direction) of the housing 22 will respectively be defined as "Y direction", "X direction", and "Z direction". Where appropriate, the leftward direction, the downward direction, and the forward direction may be given a negative (−) symbol, whereas the rightward direction, the upward direction, and the rearward direction may be given a positive (+) symbol.

As shown in FIG. 1, the purifier accommodating section 12 has a front wall 23A that serves as a front face of the first housing 23 in the Z direction as well as a lower front face of the image forming apparatus 10. An intake port 26 constituted of multiple slits extending in the X direction and arranged in the Y direction is formed over the entire surface of the front wall 23A so as to extend in the width direction (X direction) in a front view of the front wall 23A. Air is taken in through this intake port 26. A detailed description of the purifier accommodating section 12 will be provided later.

The paper accommodating section 14 is provided with a paper accommodating unit 28 that accommodates multiple sheets of recording paper P and that is loadable and unloadable into and from the second housing 24 in the Z direction. Moreover, the paper accommodating section 14 is provided with a feed roller 34 that feeds each sheet of recording paper P accommodated in the paper accommodating unit 28 toward a transport path 32 provided in the image forming apparatus 10. In the transport path 32, a pair of transport rollers 36 and a pair of transport rollers 38 are provided downstream from the feed roller 34 and transport the multiple sheets of recording paper P in a one-by-one manner.

A bottom wall 25A of the third housing 25 is provided with a through-hole 258 with a size that allows the recording paper P to pass therethrough. The interior of the second housing 24 and the interior of the third housing 25 are in spatial communication with each other via the through-hole 258. The recording paper P can be transported into the third housing 25 from the second housing 24 via the through-hole 25B. A positioning roller 42 that temporarily stops the recording paper P and then sends the recording paper P to a transfer position Q at a predetermined timing is provided in the transport path 32. Specifically, the positioning roller 42 is located downstream from the transport rollers 38 in the transport direction of the recording paper P.

A left sidewall 250 (i.e., a sidewall at the −X side) of the third housing 25 is provided with a through-hole 25D with a size that allows the recording paper P to pass therethrough. A paper output portion 44 is provided below the through-hole 25D in the left sidewall 25C. The transport path 32 also includes a path extending from the positioning roller 42 to the paper output portion 44.

The image forming section 16 has an image forming unit 50 provided therein. The image forming unit 50 includes a photoconductor 52, a charger 54, an exposure device 56, a developing device 58, a transfer roller 62, a cleaning device 64, and an erase lamp 66.

The photoconductor 52, which is cylindrical, is provided in the center of the image forming unit 50. The interior of the photoconductor 52 is connected to ground. The photoconductor 52 is rotated in a direction indicated by an arrow R (i.e., clockwise direction in FIG. 1) by a driving unit (not shown) and bears an electrostatic latent image formed by light irradiation. The charger 54 that electrically charges the outer peripheral surface of the photoconductor 52 is provided above the photoconductor 52 and faces the outer peripheral surface of the photoconductor 52.

The charger 54 has a charge wire 54A and a grid electrode 54B. By supplying the charge wire 54A with power from a power source (not shown) and applying adjustment voltage to the grid electrode 54B, corona discharge is generated due to a potential difference between the charger 54 and the photoconductor 52, whereby the outer peripheral surface of the photoconductor 52 is electrically charged. The exposure device 56 is provided downstream from the charger 54 in the rotational direction (i.e., the direction of the arrow R) of the photoconductor 52 and faces the outer peripheral surface of the photoconductor 52.

The exposure device 56 includes a light-emitting diode (LED) and performs an exposure process by emitting light according to an image signal toward the outer peripheral surface of the photoconductor 52 electrically charged by the charger 54, thereby forming an electrostatic latent image. The exposure device 56 is not limited to an LED type and may alternatively be, for example, a type that scans a laser beam by using a polygonal mirror. The developing device 58 is provided downstream, in the rotational direction of the photoconductor 52, from an area where the exposure light is emitted from the exposure device 56. The developing device 58 develops the electrostatic latent image formed on the outer peripheral surface of the photoconductor 52 by using a toner of a predetermined color (in this case, for example, black (K) color) so as to form a visible image (i.e., a developer image).

The developing device 58 has a casing member 58A serving as a body thereof. The casing member 58A contains a developer (not shown) composed of a carrier and the toner (K) supplied from a toner cartridge (not shown) via a toner supply path. A developing roller 58B whose outer peripheral surface faces the outer peripheral surface of the photoconductor 52 is provided in an opening of the casing member 58A.

The developing roller 58B is constituted of a rotatable cylindrical development sleeve (not given a reference numeral) and a magnetic member fixed within the development sleeve and having multiple magnetic poles. As the development sleeve rotates, a magnetic brush of the developer (carrier) is formed, and a layer thickness is regulated by a regulating member (not shown), thereby forming a developer layer on the outer peripheral surface of the development sleeve. A developing process is performed by transporting the developer layer on the outer peripheral surface of the development sleeve to a position facing the photoconductor 52 so as to adhere the toner onto the latent image (electrostatic latent image) formed on the outer peripheral surface of the photoconductor 52.

The transfer roller 62 is provided below the photoconductor 52 and downstream from the developing device 58 in the rotational direction of the photoconductor 52. More specifically, the transfer roller 62 is provided opposite to the photoconductor 52 with the transport path 32 (i.e., the recording paper P) interposed therebetween. The transfer roller 62 transfers the toner image formed on the outer peripheral surface of the photoconductor 52 to the transported recording paper P. Specifically, the transfer roller 62 receives electricity from a power source (not shown) so as to create a potential difference between the transfer roller 62 and the grounded photoconductor 52, thereby transferring the toner image on the photoconductor 52 onto the recording paper P. A contact position between the photoconductor 52 and the transfer roller 62 corresponds to the transfer position Q.

The cleaning device 64 is provided downstream from the transfer roller 62 in the direction of the arrow R and faces the outer peripheral surface of the photoconductor 52. A residual toner that remains on the outer peripheral surface of the photoconductor 52 without being transferred onto the recording paper P at the transfer position Q is removed by the cleaning device 64. The cleaning device 64 collects the residual toner by bringing a cleaning blade and a brush roller (not given reference numerals) into contact with the outer peripheral surface of the photoconductor 52. The erase lamp 66 is provided downstream from the cleaning device 64 as well as upstream from the charger 54 in the direction of the arrow R. The erase lamp 66 removes the electric charge from the outer peripheral surface of the photoconductor 52 after the residual toner is removed therefrom.

In the transport path 32, a fixing device 70 is provided downstream from the transfer position Q in the transport direction (indicated by an arrow A) of the recording paper P. The fixing device 70 fixes the toner image onto the recording paper P having the toner image transferred thereto by the transfer roller 62.

The fixing device 70 is disposed at the toner image side (upper side in FIG. 1) of the recording paper P and includes a heating roller 72 having a heat source (e.g., a halogen lamp) that generates heat by being supplied with electricity and a pressing roller 74 that is disposed below the heating roller 72 and that presses the recording paper P against the outer peripheral surface of the heating roller 72. The recording paper P having the toner image fixed thereon by the fixing device 70 is discharged to the paper output portion 44 via the through-hole 25D.

A second duct 80 is provided above the fixing device 70 within the third housing 25. The second duct 80 is provided for transporting air that contains odorous components (including ozone odor produced due to the corona discharge at the charger 54 (see FIG. 1) and the odor of fused toner (resin)) toward the second exhaust port 33 (see FIG. 3).

The second duct 80 is provided with a first tubular intake portion 82A for taking in air from the periphery of the fixing device 70 and a second tubular intake portion 82B for taking in air from the periphery of the charger 54. An opening of the first intake portion 82A is disposed adjacent to the fixing device 70, and an opening of the second intake portion 82B is disposed adjacent to the charger 54. A second fan 84 that takes in the air and exhausts the air through the second exhaust port 33 is provided within the second duct 80 at a position adjacent to the second exhaust port 33.

Next, an image forming process in the image forming apparatus 10 will be described.

As shown in FIG. 1, when the image forming apparatus 10 is activated, image data is output to the exposure device 56 from an image processor (not shown) or an external source. Subsequently, the charger 54 electrically charges the outer peripheral surface (i.e., surface) of the photoconductor 52. Then, the outer peripheral surface of the photoconductor 52 electrically charged by the charger 54 is exposed to light emitted from the exposure device 56 in accordance with the image data, thereby forming an electrostatic latent image on the surface of the photoconductor 52. Furthermore, the electrostatic latent image formed on the outer peripheral surface of the photoconductor 52 is developed into a black (K) toner image by the developing device 58.

The recording paper P within the paper accommodating unit 28 is fed toward the transport path 32 by the feed roller 34 and is transported by the transport rollers 36 and the transport rollers 38. Then, the recording paper P transported along the transport path 32 to the positioning roller 42 is transported to the transfer position Q by the positioning roller 42 in synchronization with the rotation of the photoconductor 52 (i.e., movement of the toner image). The toner image on the outer peripheral surface of the photoconductor 52 is transferred by the transfer roller 62 onto the recording paper P transported to the transfer position Q.

Subsequently, the recording paper P having the toner image transferred thereon is transported to the fixing device 70 where the toner image is heated and pressed by the heating roller 72 and the pressing roller 74, whereby the toner image becomes fixed to the recording paper P. The recording paper P having the toner image fixed thereon is discharged to the paper output portion 44.

Next, the space purifier 100 will be described.

As shown in FIG. 2B, the space purifier 100 includes the first duct 102 serving as an example of a duct provided within the first housing 23, a first fan 106 serving as an example of a fan provided within the first duct 102, a guide duct 110 that covers the first exhaust port 31 and the second exhaust port 33 (see FIG. 3), and a filter 112 and a louver 114 provided in the guide duct 110.

The first duct 102 has a shape of an angular tube and has a first end (opening) attached to the intake port 26 within the first housing 23 and a second end (opening) attached to the first exhaust port 31. Thus, air is guided from the intake port 26 toward the first exhaust port 31. A pre-filter 104 is attached to an area adjacent to the intake port 26 at the first end of the first duct 102. The pre-filter 104 is provided for removing dust that enters the first duct 102 through the intake port 26 and restricts the entry of dust while allowing air to pass therethrough.

The first fan 106 includes two fans that are arranged in the X direction and that are attached to an area adjacent to the first exhaust port 31 at the second end of the first duct 102. The controller 18 (see FIG. 1) drives a driving source (not shown) so as to rotate the first fan 106. The rotating first fan 106 takes in air from the intake port 26 and exhausts the air in the first duct 102 to the guide duct 110 via the first exhaust port 31.

As shown in FIG. 2A, the guide duct 110 is formed in plan view with an opening facing toward the rear wall 29, and is attached to the rear wall 29. Furthermore, as shown in FIG. 3, the guide duct 110 includes a lower duct 110A that covers the first exhaust port 31 and an upper duct 110B that is disposed above the lower duct 110A and that covers the second exhaust port 33. Moreover, as shown in FIG. 2B, a glass-wool sound absorbing material 115, for example, is bonded to an inner wall surface of the guide duct 110.

As shown in FIG. 3, the lower duct 110A has a curved wall 110C (see FIG. 2B) formed by curving the bottom of the lower duct 110A in the +Y direction (upward). Thus, a flow of air emitted in the +Z direction from the first exhaust port 31 is guided (deflected) in the +Y direction. A width W1 of the lower duct 110A in the X direction is smaller than a width W2 of the image forming apparatus 10 in the X direction (i.e., W1<W2).

The upper duct 110B is connected with an upper portion of the lower duct 110A and is configured to continually guide the air flowing from the lower duct 110A in the +Y direction. The upper duct 110B has the width W2 in the X direction and is thus wider than the lower duct 110A.

Consequently, an upper portion of the upper duct 110B located downstream from (above) the second exhaust port 33 is defined as a large width portion 110D whose cross-sectional area in a direction orthogonal to the exhaust direction (+Y direction) is larger than a cross-sectional area of the lower duct 110A at the first exhaust port 31 side. In this exemplary embodiment, for example, the width, in the X direction, at the upstream side of the second exhaust port 33 in the upper duct 110B and the width, in the X direction, at the downstream side of the second exhaust port 33 are both equal to the width W2.

The filter 112 is provided to cover an X-Z, plane in the large width portion 110D and has a space purifying function for removing foreign objects (such as pollen and viruses) and odorous components (including ozone odor and the odor of fused toner) from exhaust air. The louver 114 has an opening with a size that allows air to pass therethrough while minimizing the entry of foreign objects into the guide duct 110. The louver 114 is attached over the filter 112 in the large width portion 110D.

Multiple substrates that constitute the controller 18 are set in a region not provided with the guide duct 110, as the image forming apparatus 10 is viewed from the rear side (i.e., from the +Z side), so that the width of the image forming apparatus 10 in the +Z direction is prevented from being increased by an installation space occupied by the controller 18.

Next, the operation according to this exemplary embodiment will be described.

Figure 4A:
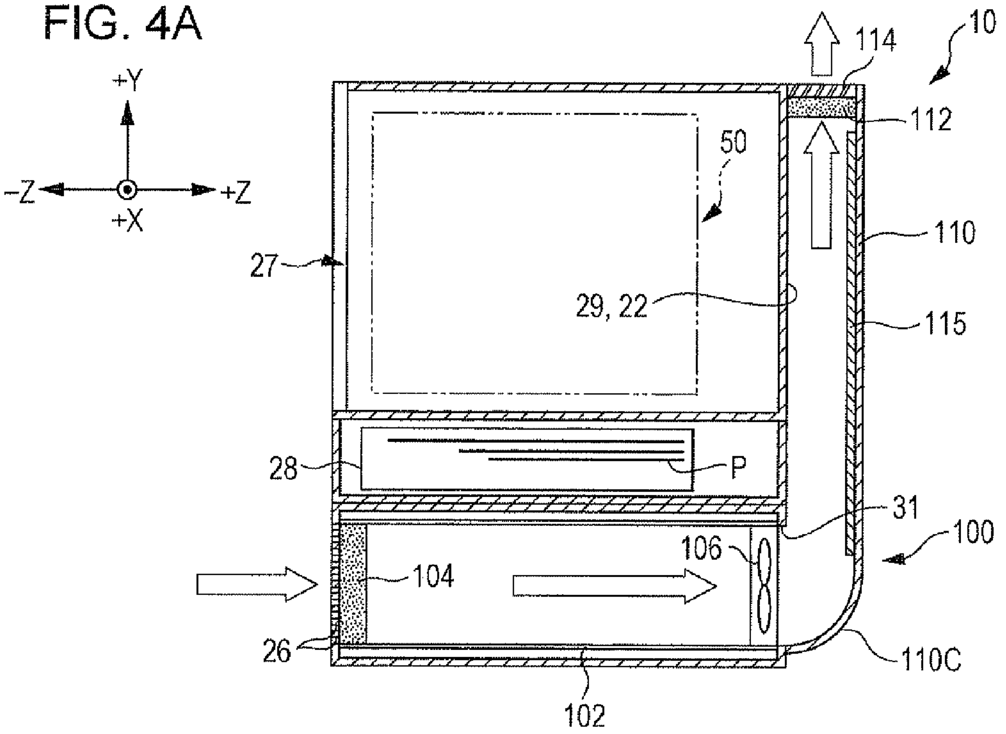
FIGS. 4A and 4B illustrate the flow of air inside and outside the image forming apparatus according to the exemplary embodiment of the present invention.

Referring to FIG. 4A, when the controller 18 (see FIG. 1) rotates the first fan 106 in the space purifier 100, air flows into (i.e., is taken into) the first duct 102 from outside the image forming apparatus 10 via the intake port 26. At this time, dust entering the first duct 102 via the intake port 26 is removed by the pre-filter 104. The air flowing into the first duct 102 flows through the first duct 102 toward the first fan 106 and is exhausted into the guide duct 110 via the first exhaust port 31.

Referring to FIG. 1, when an image forming process is commenced by the image forming unit 50, and the second fan 84 is rotated by the controller 18, the air surrounding the charger 54 and the air surrounding the fixing device 70 are taken into the second duct 80. Then, the air flowing into the second duct 80 flows through the second duct 80 toward the second fan 84 and is exhausted into the guide duct 110 (see FIG. 3) via the second exhaust port 33 (see FIG. 3).

Figure 4B:
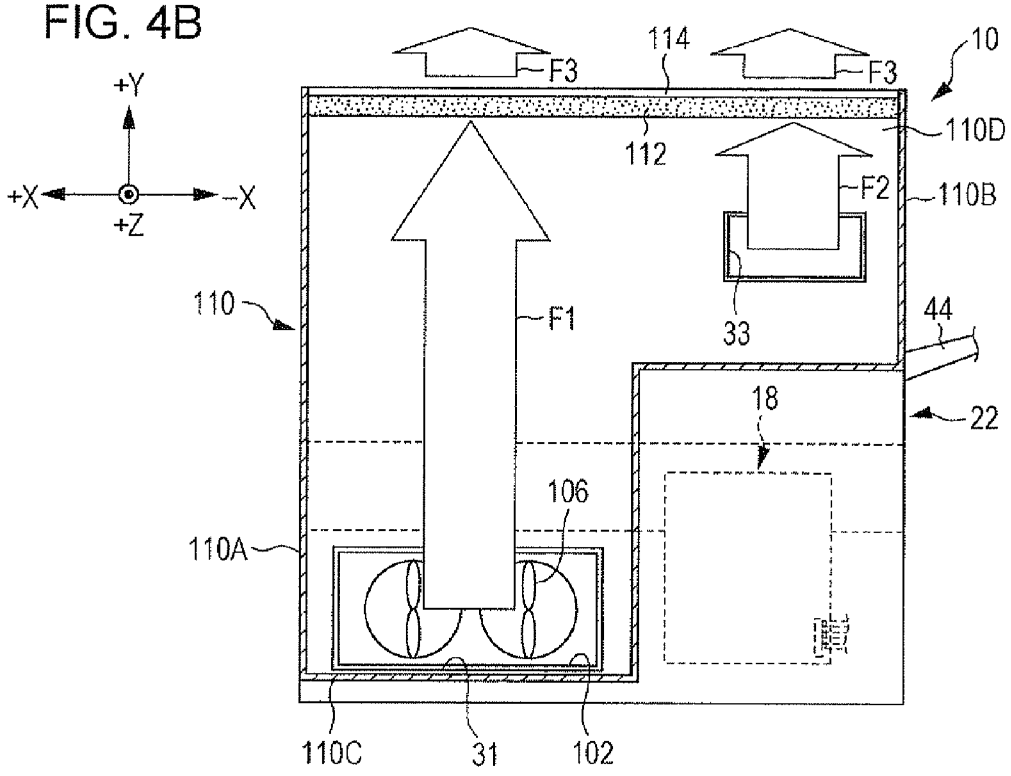

Subsequently, referring to FIG. 4B, exhaust air (F1) from the first exhaust port 31 and exhaust air (F2) from the second exhaust port 33 flow in the +Y direction through the guide duct 110 so as to reach the filter 112. The filter 112 removes foreign objects and odorous components contained in the exhaust air F1 and the exhaust air F2 so that clean air (F3) is exhausted from the louver 114. The air F3 exhausted from the louver 114 circulates throughout the interior of a room in which the image forming apparatus 10 is installed. In other words, the function of the space purifier 100 is achieved.

Accordingly, in the space purifier 100, the first exhaust port 31 and the second exhaust port 33 are covered by the guide duct 110, and the filter 112 that covers the air flow passage is provided downstream from the first exhaust port 31 and the second exhaust port 33 of the guide duct 110. Therefore, even when exhaust air that contains odorous components is exhausted from the second exhaust port 33, the air is either retained in the guide duct 110 or released outward as clean air by passing through the filter 112. This may substantially prevent the exhaust air that contains odorous components from being diffused outward from the image forming apparatus 10.

In the space purifier 100, the second exhaust port 33 is not located above the first exhaust port 31. Thus, since the second exhaust port 33 is not disposed above the first exhaust port 31, the flow of exhaust air F1 from the first exhaust port 31 is not hindered by the flow of exhaust F2 from the second exhaust port 33. Specifically, the exhaust air F2 from the second exhaust port 33 does not become an air curtain that restricts the flow of exhaust air F1 from the first exhaust port 31. Consequently, the clean air F3 circulates throughout the interior of the room in which the image forming apparatus 10 is installed.

Furthermore, in the space purifier 100, since the louver 114 is disposed at a downstream end (upper end) of the guide duct 110 instead of at the first exhaust port 31, the exhaust air from the first fan 106 does not directly strike the louver 114. In addition, since the upper duct 110B has an increased width (width W2) relative to the lower duct 110A (with the width W1), the flow rate of exhaust air flowing from the first exhaust port 31 toward the louver 114 decreases within the upper duct 110B. Therefore, wind noise produced by the louver 114 may be reduced, as compared with a configuration in which the exhaust air from the first fan 106 is made to directly strike the louver 114 or a configuration in which the lower duct 110A and the upper duct 110B have the same width.

Furthermore, in the space purifier 100, the periphery of the first exhaust port 31 is covered by the guide duct 110, and the sound absorbing material 115 (see FIG. 4A) is provided within the guide duct 110. Consequently, operating noise of the first fan 106 provided within the first duct 102 may be substantially prevented from leaking outward from the image forming apparatus 10.

The present invention is not limited to the exemplary embodiment described above.

The image forming apparatus 10 is not limited to a monochrome type, and may alternatively be a multi-color type that uses yellow (Y), magenta (M), cyan (C), and black (K) toners. Furthermore, the width of the large width portion 110D of the guide duct 110 in the X direction may gradually increase upward. Moreover, a partition plate may be provided within the guide duct 110 so as to separate the exhaust air F1 from the first exhaust port 31 and the exhaust air F2 from the second exhaust port 33 from each other.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a duct through which air flows from an intake port formed in a front face of an apparatus body toward a first exhaust port formed in a rear face of the apparatus body;

a fan that is provided in the duct and that takes in the air via the intake port and exhausts the air via the first exhaust port;

a guide duct that is provided at the rear face of the apparatus body and that covers the first exhaust port and a second exhaust port via which exhaust air containing an odorous component produced inside the apparatus body is exhausted from the rear face of the apparatus body, the guide duct guiding the exhaust air from the first exhaust port and the second exhaust port upward in a vertical direction; and a filter that is provided in the guide duct downstream from the first exhaust port and the second exhaust port in the vertical direction and that removes the odorous component from the exhaust air exhausted from the first exhaust port and the second exhaust port.

2. The image forming apparatus according to claim 1, wherein the second exhaust port is not located above the first exhaust port.

3. The image forming apparatus according to claim 1, wherein the guide duct has a large width portion provided downstream from the first exhaust port and the second exhaust port in the vertical direction and whose cross-sectional area in a direction orthogonal to an exhaust direction is larger than a cross-sectional area of the guide duct at a side thereof adjacent to the first exhaust port, the large width portion being provided with a louver that minimizes entry of a foreign object.

4. The image forming apparatus according to claim 2, wherein the guide duct has a large width portion provided downstream from the first exhaust port and the second exhaust port in the vertical direction and whose cross-sectional area in a direction orthogonal to an exhaust direction is larger than a cross-sectional area of the guide duct at a side thereof adjacent to the first exhaust port, the large width portion being provided with a louver that minimizes entry of a foreign object.

5. The image forming apparatus according to claim 1, wherein the intake port is formed in the front face of the apparatus body, and the air flows through the intake port from outside the image forming apparatus and into the duct.

* * * * *